US 11,744,409 B1

United States Patent
Bingham

(10) Patent No.: US 11,744,409 B1
(45) Date of Patent: Sep. 5, 2023

(54) ORAL CARE PRODUCTS ORGANIZER

(71) Applicant: Anthony Bingham, Prince George, VA (US)

(72) Inventor: Anthony Bingham, Prince George, VA (US)

( * ) Notice: Subject to any disclaimer, the term of this patent is extended or adjusted under 35 U.S.C. 154(b) by 0 days.

(21) Appl. No.: 17/713,279

(22) Filed: Apr. 5, 2022

(51) Int. Cl.
*A47K 1/09* (2006.01)
*A61C 19/00* (2006.01)

(52) U.S. Cl.
CPC .............. *A47K 1/09* (2013.01); *A61C 19/002* (2013.01)

(58) Field of Classification Search
CPC .. A47K 1/09; A47K 5/18; A45C 11/16; A45C 11/008; A45D 44/18; A46B 17/02; A47G 29/08; A61C 19/02; A61C 19/10; A61C 19/002
USPC ............... 211/65; 206/362, 362.1, 368, 63.5; 132/314, 287, 308, 310
See application file for complete search history.

(56) References Cited

U.S. PATENT DOCUMENTS

| | | | | |
|---|---|---|---|---|
| 338,402 A * | 3/1886 | Griswold | ................. | A47K 1/09 211/1 |
| 483,579 A * | 10/1892 | Peters | ................... | A45D 33/20 132/287 |
| 1,336,345 A * | 4/1920 | Cornelius | .............. | A47B 67/02 132/308 |
| 1,666,564 A * | 4/1928 | Hahn | ...................... | A47K 1/09 132/310 |
| 1,780,757 A * | 11/1930 | Lawson, Sr. | ............. | A47K 1/09 132/310 |
| 1,838,687 A * | 12/1931 | Lawson, Sr. | ............. | A47K 1/09 132/310 |
| 1,975,691 A * | 10/1934 | Hibbs | ...................... | A47K 1/09 222/93 |
| 2,136,843 A * | 11/1938 | Dinkel | .................. | A47B 67/005 312/285 |
| 2,396,932 A * | 3/1946 | Slaton | .................... | A45D 33/28 206/229 |
| 2,415,447 A * | 2/1947 | Stanton | .................... | A47K 1/09 D6/531 |
| 2,533,757 A | 12/1950 | Arsene | | |
| 2,576,560 A * | 11/1951 | Bidmon | ................... | A47K 1/09 206/217 |
| 3,732,973 A * | 5/1973 | Crawford | ............... | A45D 44/20 206/83 |
| 3,884,635 A * | 5/1975 | Sloan | .................... | A45D 44/18 206/209 |

(Continued)

FOREIGN PATENT DOCUMENTS

WO 2002069771 9/2002

*Primary Examiner* — Jennifer E. Novosad
(74) *Attorney, Agent, or Firm* — Kyle A. Fletcher, Esq.

(57) ABSTRACT

The oral care products organizer comprises a housing, a tablet holder, a drawer, and a drawer insert. The oral care products organizer is a device for organizing and storing oral care products. As non-limiting examples, the oral care products may comprise one or more toothbrushes, a tube of toothpaste, dentures, and a plurality of denture cleansing tablets. The tablet holder may store the plurality of denture cleansing tablets. The dentures may be stored in the drawer insert within the drawer. The housing may store the one or more toothbrushes and the tablet holder under a cap that protects the one or more toothbrushes from exposure. The drawer may be inserted into a drawer aperture at the bottom of the housing for storage.

18 Claims, 5 Drawing Sheets

(56) References Cited

U.S. PATENT DOCUMENTS

| | | | | |
|---|---|---|---|---|
| 4,219,035 A * | 8/1980 | Deconinck | A47K 1/09 | 211/74 |
| 4,239,308 A * | 12/1980 | Bradley | A45C 11/16 | 312/226 |
| 4,446,972 A * | 5/1984 | Sussman | A47G 29/08 | 211/60.1 |
| 4,481,962 A * | 11/1984 | Pesta | A45D 40/00 | 132/314 |
| 4,705,194 A * | 11/1987 | Judge | B65D 35/24 | 222/93 |
| 4,979,525 A * | 12/1990 | Chiou | A46B 7/04 | 132/289 |
| 4,999,943 A * | 3/1991 | Crabtree | A01K 97/06 | 43/57.1 |
| 5,078,526 A * | 1/1992 | Corona | A46B 11/0006 | 401/268 |
| D336,398 S | 6/1993 | Shafer | | |
| 5,215,193 A * | 6/1993 | Dennis | A47K 5/18 | 206/229 |
| 5,337,890 A * | 8/1994 | Lai | A45D 40/22 | 132/304 |
| 5,507,414 A * | 4/1996 | Ong | A47K 5/1214 | 222/173 |
| 5,513,754 A * | 5/1996 | Chang | A45C 11/008 | 206/581 |
| 5,522,497 A * | 6/1996 | Stacy | A45D 44/18 | 206/362.1 |
| 5,566,823 A * | 10/1996 | Summers | A46B 17/06 | 206/362.1 |
| 5,662,130 A * | 9/1997 | Wiltshire | A61C 15/046 | 132/309 |
| 5,678,908 A * | 10/1997 | Wang | A47B 81/00 | 312/285 |
| 5,738,122 A * | 4/1998 | Armbruster | A45D 27/22 | 132/294 |
| 5,769,245 A * | 6/1998 | Butler | A47K 1/09 | 248/110 |
| 5,786,749 A * | 7/1998 | Johnson | A47K 1/09 | 248/312.1 |
| 5,839,578 A * | 11/1998 | Avery | A47K 1/09 | 206/362.2 |
| 5,890,493 A * | 4/1999 | Horng | A47K 5/18 | 132/308 |
| 5,996,816 A | 12/1999 | Bernard | | |
| 6,053,338 A * | 4/2000 | Avery | A46B 15/0055 | 211/74 |
| 6,119,854 A * | 9/2000 | Prentice | A61L 2/186 | 206/362.1 |
| 6,135,279 A * | 10/2000 | Dryer | A46B 17/06 | 206/362.1 |
| 6,186,324 B1 * | 2/2001 | Catterson | A45D 44/18 | 220/636 |
| 6,497,236 B1 * | 12/2002 | Yates | A61C 15/043 | 220/521 |
| 6,648,390 B1 * | 11/2003 | Yang | B25H 3/025 | 220/4.27 |
| 6,935,515 B1 * | 8/2005 | Sookoo | A47K 1/09 | 211/65 |
| 7,225,633 B2 * | 6/2007 | DeMars | F25D 3/08 | 62/457.2 |
| 7,581,638 B2 * | 9/2009 | Shaw | A46B 17/06 | 206/362.1 |
| 7,806,284 B2 * | 10/2010 | Mangano | A45C 11/16 | 211/85.2 |
| 7,967,355 B2 * | 6/2011 | Lin | B25H 3/025 | 206/372 |
| 8,371,314 B1 * | 2/2013 | Herd | A45D 40/24 | 132/286 |
| 8,944,710 B2 * | 2/2015 | Cocchioni | B65D 43/161 | 401/125 |
| 9,629,506 B1 | 4/2017 | Schwarz | | |
| 9,662,192 B2 * | 5/2017 | Chastain | A61C 19/02 | |
| 9,801,503 B1 * | 10/2017 | Burk | A47K 1/09 | |
| 2002/0121449 A1 | 9/2002 | Bowie | | |
| 2004/0025899 A1 * | 2/2004 | Pinsky | A45D 44/18 | 132/310 |
| 2004/0035808 A1 * | 2/2004 | Berry | B25H 3/04 | 211/70.6 |
| 2005/0109662 A1 * | 5/2005 | Kirk | A47K 1/09 | 206/581 |
| 2007/0034536 A1 | 2/2007 | Jackson | | |
| 2007/0235395 A1 * | 10/2007 | Mondale | A46B 17/00 | 211/65 |
| 2008/0179323 A1 * | 7/2008 | Circosta | B65D 43/167 | 220/8 |
| 2009/0050500 A1 * | 2/2009 | Ultimo | A45C 11/24 | 206/362.1 |
| 2009/0200184 A1 * | 8/2009 | Cullen | A47K 1/09 | 206/362.2 |
| 2011/0174823 A1 * | 7/2011 | Silva | A47K 1/09 | 248/110 |
| 2011/0296605 A1 | 12/2011 | Kerr | | |
| 2013/0171037 A1 * | 7/2013 | Im | A61L 2/10 | 250/455.11 |
| 2014/0311932 A1 * | 10/2014 | Sakaguchi | A61C 8/0087 | 206/368 |
| 2014/0346067 A1 * | 11/2014 | Martin | A47K 1/09 | 206/362.1 |
| 2015/0001128 A1 * | 1/2015 | Jaffe | A45C 11/16 | 206/581 |
| 2018/0071420 A1 * | 3/2018 | Bestel | A61L 2/26 | |
| 2020/0100880 A1 * | 4/2020 | Scharf | A61C 5/007 | |
| 2020/0390207 A1 * | 12/2020 | Millings | A45C 5/065 | |
| 2022/0022641 A1 * | 1/2022 | Thompson | A47K 1/09 | |

* cited by examiner

ORAL CARE PRODUCTS ORGANIZER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of oral hygiene, more specifically, an oral care products organizer.

SUMMARY OF INVENTION

The oral care products organizer comprises a housing, a tablet holder, a drawer, and a drawer insert. The oral care products organizer is a device for organizing and storing oral care products. As non-limiting examples, the oral care products may comprise one or more toothbrushes, a tube of toothpaste, dentures, and a plurality of denture cleansing tablets. The tablet holder may store the plurality of denture cleansing tablets. The dentures may be stored in the drawer insert within the drawer. The housing may store the one or more toothbrushes and the tablet holder under a cap that protects the one or more toothbrushes from exposure. The drawer may be inserted into a drawer aperture at the bottom of the housing for storage.

An object of the invention is to store oral care products. Another object of the invention is to provide a drawer comprising a drawer insert for storing dentures.

A further object of the invention is to provide a tablet holder for storing a plurality of denture cleansing tablets.

Yet another object of the invention is to provide space within a housing for storing the tablet holder, one or more toothbrushes, and a tube of toothpaste.

These together with additional objects, features and advantages of the oral care products organizer will be readily apparent to those of ordinary skill in the art upon reading the following detailed description of the presently preferred, but nonetheless illustrative, embodiments when taken in conjunction with the accompanying drawings.

In this respect, before explaining the current embodiments of the oral care products organizer in detail, it is to be understood that the oral care products organizer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the oral care products organizer.

It is therefore important that the claims be regarded as including such equivalent construction insofar as they do not depart from the spirit and scope of the oral care products organizer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
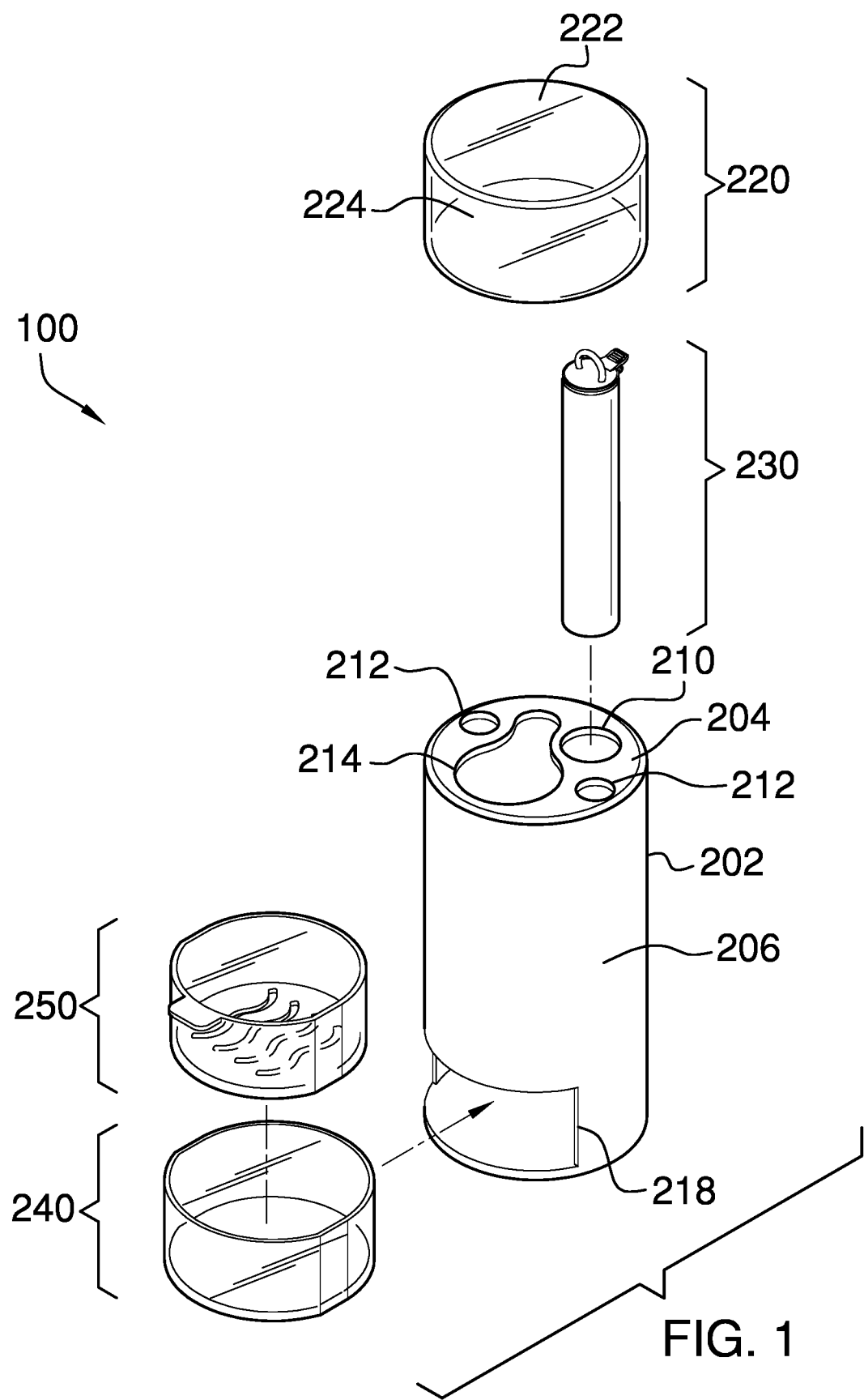
FIG. 1 is an exploded view of an embodiment of the disclosure.
Figure 2:
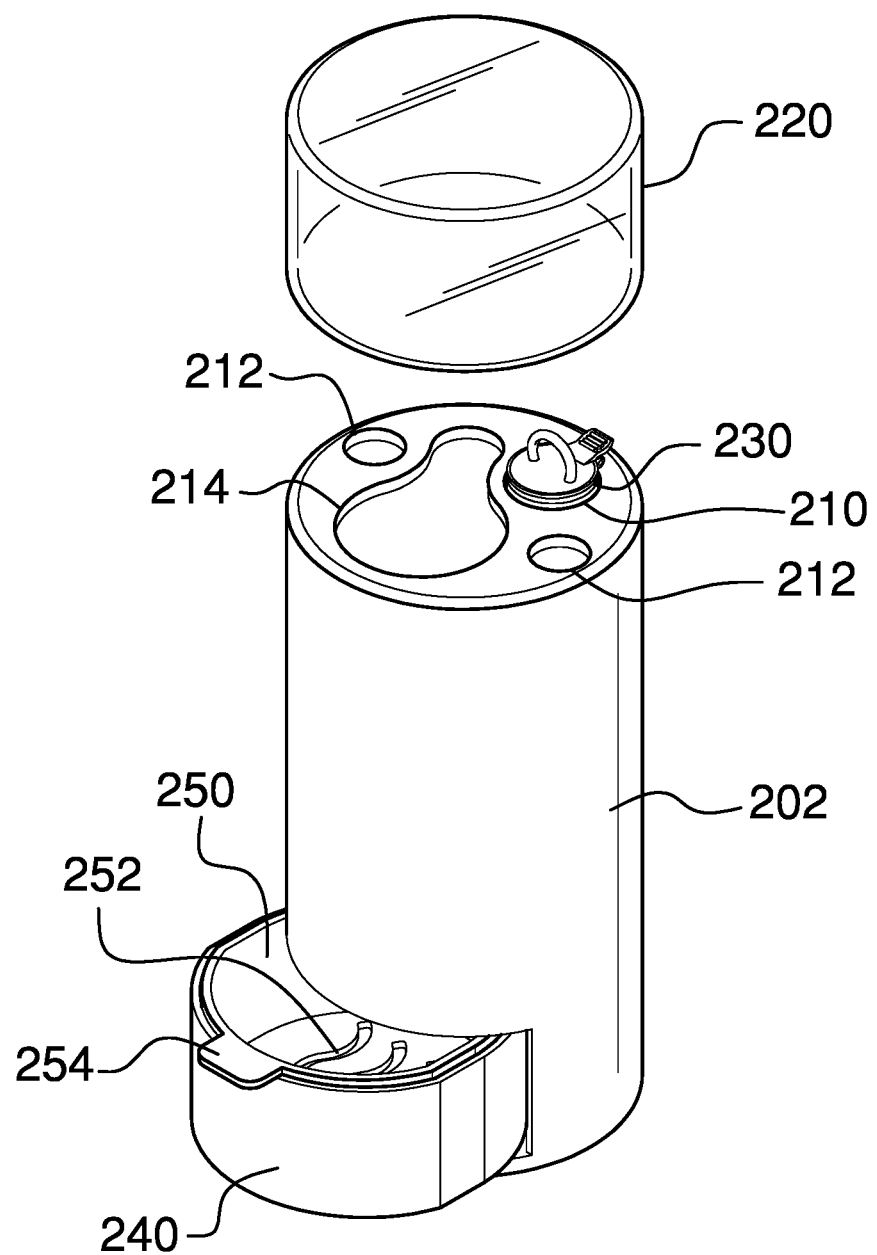
FIG. 2 is an isometric view of an embodiment of the disclosure.
Figure 3:
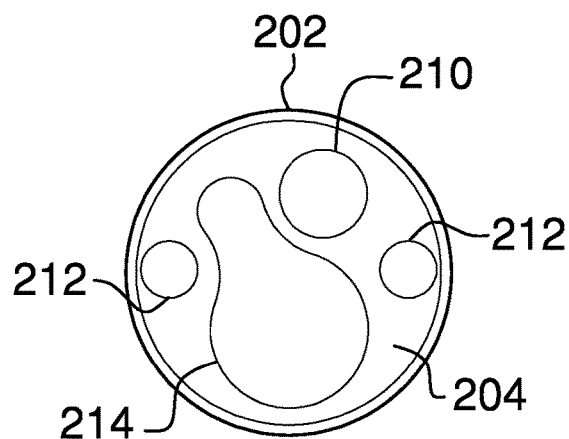
FIG. 3 is a top view of an embodiment of the disclosure, illustrating the housing body.
Figure 4:
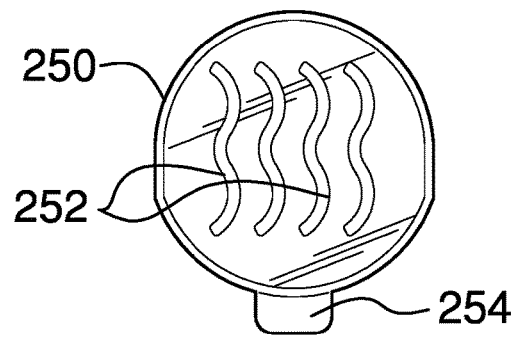
FIG. 4 is a top view of an embodiment of the disclosure, illustrating the drawer insert.
Figure 5:
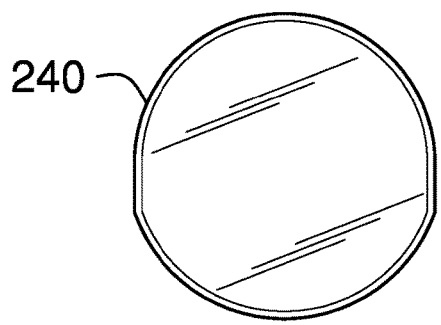
FIG. 5 is a top view of an embodiment of the disclosure, illustrating the drawer.
Figure 6:
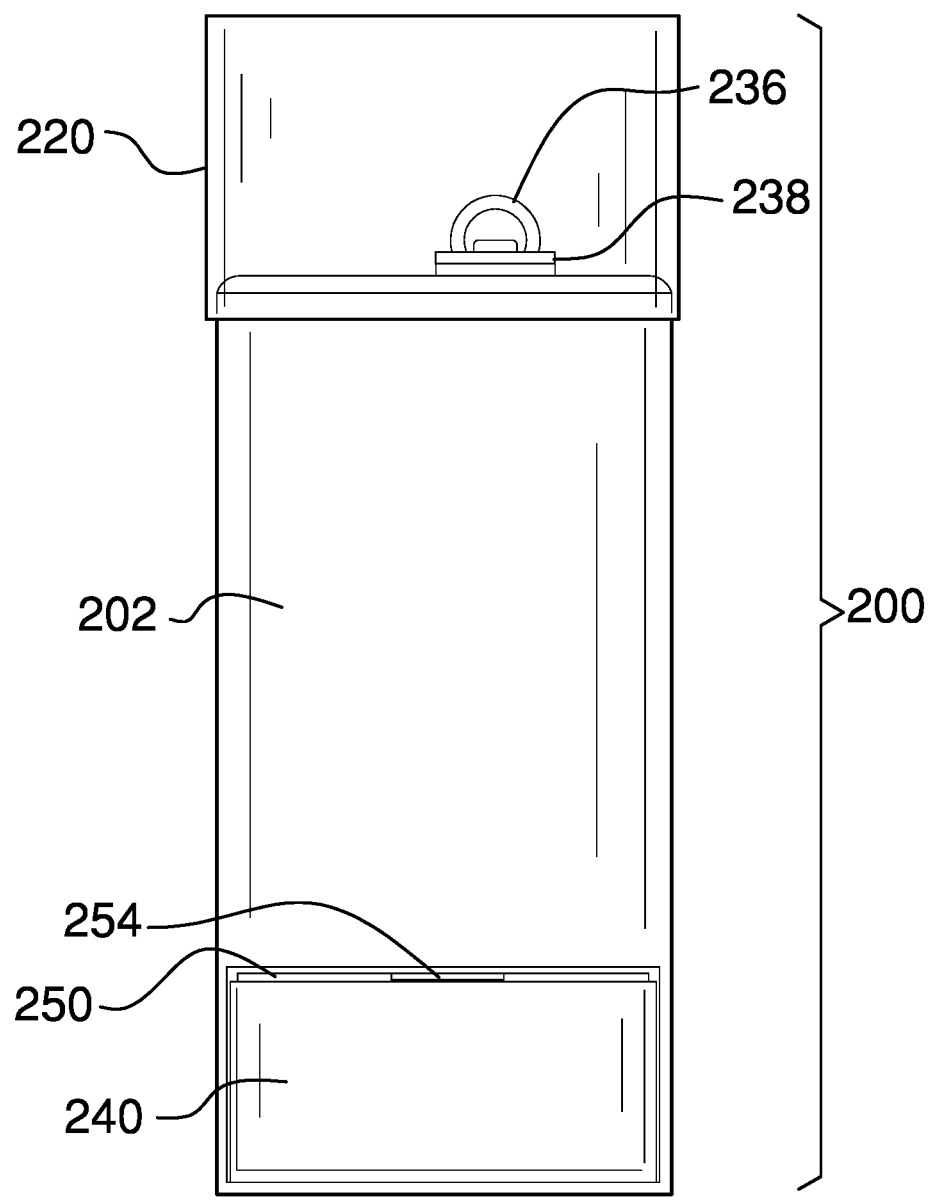
FIG. 6 is a front view of an embodiment of the disclosure.
Figure 7:
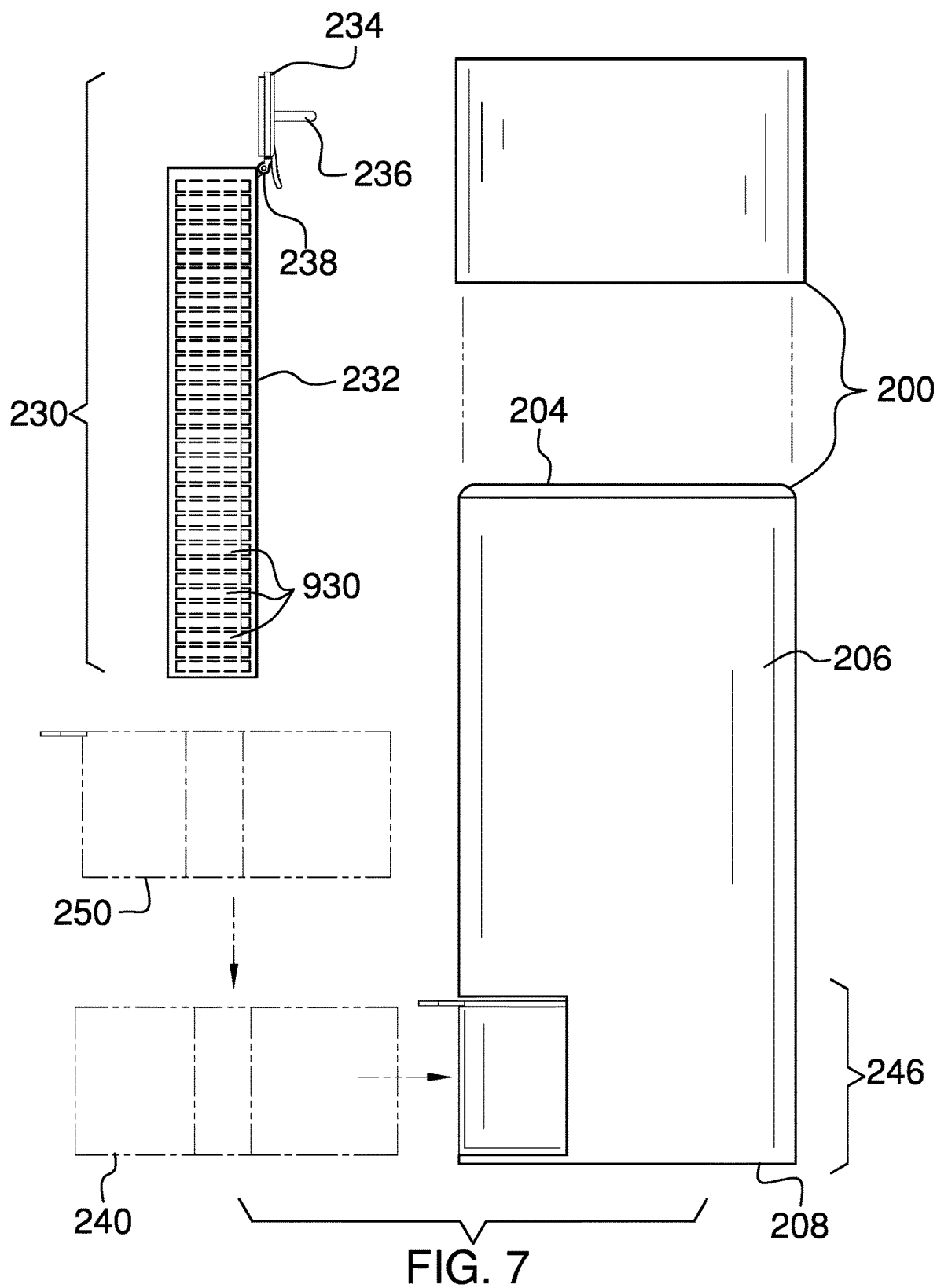
FIG. 7 is a side view of a second embodiment of the disclosure.

Detailed reference will now be made to a first potential embodiment of the disclosure, which is illustrated in FIGS. 1 through 7.

The oral care products organizer 100 (hereinafter invention) comprises a housing 200, a tablet holder 230, a drawer 240, and a drawer insert 250. The invention 100 is a device for organizing and storing oral care products. As non-limiting examples, the oral care products may comprise one or more toothbrushes, a tube of toothpaste, dentures, and a plurality of denture cleansing tablets 930. The tablet holder 230 may store the plurality of denture cleansing tablets 930. The dentures may be stored in the drawer insert 250 within the drawer 240. The housing 200 may store the one or more toothbrushes and the tablet holder 230 under a cap 220 that protects the one or more toothbrushes from exposure. The drawer 240 may be inserted into a drawer aperture 218 at the bottom of the housing 200 for storage.

The housing 200 may comprise a housing body 202 and the cap 220. The housing body 202 may be a cylindrical enclosure comprising a body top surface 204, a body side wall 206, and a body bottom wall 208. The body top surface 204 may comprise a tablet holder aperture 210, a plurality of toothbrush apertures 212, and a toothpaste aperture 214. The tablet holder aperture 210 may provide access to a hollow interior such that the tablet holder 230 may rest within the hollow interior. The plurality of toothbrush apertures 212 may provide access to the hollow interior such that the one or more toothbrushes may rest within the hollow interior. The toothpaste aperture 214 may provide access to the hollow interior such that the tube of toothpaste may rest within the hollow interior. The depth of the hollow interior of the housing body 202 may be such that the tops of the tablet holder 230, the one or more toothbrushes and the tube of toothpaste extend above the body top surface 204 where the oral care products may be grasped for removal.

The cap 220 may cover the top of the housing body 202 to protect the one or more toothbrushes from contamination. The cap 220 may be cylindrical and may comprise a cap top 222 and a cap side wall 224. The cap 220 may be hollow and the bottom of the cap 220 may be open such that the oral care products stored in the housing body 202 may extend up into the cap 220 when the cap 220 is in place. The cap 220 may be non-opaque such that the oral care products may be visible through the cap 220.

The tablet holder 230 may be a container for storing the plurality of denture cleansing tablets 930. The tablet holder 230 may comprise a tablet holder tube 232, a tablet holder cap 234, and a tablet holder hinge 238. The tablet holder tube 232 may be a hollow cylindrical tube comprising a closed bottom and an open top. The plurality of denture cleansing tablets 930 may be inserted into and removed from the tablet holder tube 232 via the open top. The tablet holder tube 232 may be non-opaque such that the number of individual denture cleansing tablets remaining in the tablet holder tube 232 may be visible through the tablet holder tube 232.

The tablet holder cap 234 may be hingedly coupled to the top of the tablet holder tube 232 by the tablet holder hinge 238. The tablet holder cap 234 may be closed to retain the plurality of denture cleansing tablets 930 within the tablet holder tube 232 and may be opened to remove one or more of the individual denture cleansing tablets. A handle 236 on the tablet holder cap 234 may aid in removing the tablet holder 230 from the housing body 202 and may aid in opening the tablet holder cap 234.

The drawer 240 may provide storage for the dentures. Specifically, the dentures may be placed into the drawer insert 250 and the drawer insert 250 may be placed into the drawer 240. The drawer 240 may slide into a drawer cavity 246 located at the bottom of the housing body 202. Access to the drawer cavity 246 may be via the drawer aperture 218.

The drawer 240 may be a cylindrical, open-top container. The drawer 240 may be non-opaque such that the dentures may be seen from outside of the drawer 240.

The drawer insert 250 may be a cylindrical open-top tray for holding the dentures. The drawer insert 250 may be non-opaque such that the dentures may be seen from outside of the drawer 240. The drawer insert 250 may comprise a plurality of drainage apertures 252 on the bottom of the drawer insert 250 that may enable moisture from the dentures to drain out of the drawer insert 250 into the drawer 240. The drawer insert 250 may comprise a tab 254 that may be adapted for a user to grasp when removing the drawer insert 250 from the drawer 240 or when returning the drawer insert 250 to the drawer 240.

In use, the housing body 202 may be placed on a bathroom counter or sink to organize the oral care products. The tablet holder 230 may be filled with a plurality of denture cleansing tablets 930 and the tablet holder cap 234 be closed. The tablet holder 230, a tube of toothpaste, one or more toothbrushes, or any combination thereof may be placed into the housing body 202 through the top of the housing body 202 and the cap 220 may be placed onto the housing body 202 to protect the oral care products. The dentures may be placed into the drawer insert 250 and the drawer insert 250 may be placed into the drawer 240. The drawer 240 may be placed into the housing body 202 through the drawer aperture 218. The invention 100 may be picked up as one item that may be packed into a suitcase for travel without the risk of leaving any of the oral care products behind.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

As used in this disclosure, a "cavity" may be an empty space or negative space that is formed within an object.

As used herein, the words "couple", "couples", "coupled" or "coupling", may refer to connecting, either directly or indirectly, and does not necessarily imply a mechanical connection.

As used in this disclosure, a "drawer" may be a storage compartment that is designed to slide into and out of a larger object.

As used in this disclosure, a "hinge" may be a device that permits the turning, rotating, or pivoting of a first object relative to a second object.

As used in this disclosure, a "housing" may be a rigid or semi-rigid casing that encloses and protects one or more devices.

As used in this disclosure, the word "interior" may be used as a relational term that implies that an object is located or contained within the boundary of a structure or a space.

As used herein, "non-opaque" may refer to the optical properties of an object that is either transparent or translucent.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An oral care products organizer comprising:
a housing, a tablet holder, a drawer, and a drawer insert;
wherein the oral care products organizer is a device for organizing and storing oral care products;
wherein the tablet holder is adapted to store a plurality of denture cleansing tablets;
wherein dentures are adapted to be stored in the drawer insert within the drawer;
wherein the housing is adapted to store one or more toothbrushes and the tablet holder under a cap;
wherein the cap is adapted to protect the one or more toothbrushes from exposure;
wherein the drawer is inserted into a drawer aperture at the bottom of the housing for storage;
wherein the housing comprises a housing body and the cap;
wherein the housing body is a cylindrical enclosure comprising a body top surface, a body side wall, and a body bottom wall;
wherein the body top surface comprises a tablet holder aperture, a plurality of toothbrush apertures, and a toothpaste aperture;
wherein the tablet holder aperture provides access to a hollow interior such that the tablet holder is adapted to rest within the hollow interior.

2. The oral care products organizer according to claim 1 wherein the plurality of toothbrush apertures provide access to the hollow interior such that the one or more toothbrushes is adapted to rest within the hollow interior.

3. The oral care products organizer according to claim 2 wherein the toothpaste aperture provides access to the hollow interior such that a tube of toothpaste is adapted to rest within the hollow interior.

4. The oral care products organizer according to claim 3 wherein the depth of the hollow interior of the housing body is such that the tops of the tablet holder, the one or more toothbrushes and the tube of toothpaste extend above the body top surface where the oral care products are grasped for removal.

5. The oral care products organizer according to claim 4 wherein the cap covers the top of the housing body;
wherein the cap is cylindrical and comprises a cap top and a cap side wall;
wherein the cap is hollow and the bottom of the cap is open such that the oral care products stored in the housing body extend up into the cap when the cap is in place.

6. The oral care products organizer according to claim 5 wherein the cap is non-opaque such that the oral care products are visible through the cap.

7. The oral care products organizer according to claim 5 wherein the tablet holder is a container for storing the plurality of denture cleansing tablets;
wherein the tablet holder comprises a tablet holder tube, a tablet holder cap, and a tablet holder hinge;
wherein the tablet holder tube is a hollow cylindrical tube comprising a closed bottom and an open top;
wherein the plurality of denture cleansing tablets are adapted to be inserted into and removed from the tablet holder tube via the open top.

8. The oral care products organizer according to claim 7 wherein the tablet holder tube is non-opaque such that the number of individual denture cleansing tablets remaining in the tablet holder tube is adapted to be visible through the tablet holder tube.

9. The oral care products organizer according to claim 7 wherein the tablet holder cap is hingedly coupled to the top of the tablet holder tube by the tablet holder hinge;
wherein the tablet holder cap is closed to retain the plurality of denture cleansing tablets within the tablet holder tube and is opened to remove one or more of the individual denture cleansing tablets.

10. The oral care products organizer according to claim 9 wherein a handle on the tablet holder cap aids in removing the tablet holder from the housing body and aids in opening the tablet holder cap.

11. The oral care products organizer according to claim 10 wherein the drawer provides storage for the dentures;
wherein the dentures are adapted to be placed into the drawer insert and the drawer insert is placed into the drawer.

12. The oral care products organizer according to claim 11 wherein the drawer slides into a drawer cavity located at the bottom of the housing body;
wherein access to the drawer cavity is via the drawer aperture.

13. The oral care products organizer according to claim 12 wherein the drawer is a cylindrical, open-top container.

14. The oral care products organizer according to claim 13 wherein the drawer is non-opaque such that the dentures are adapted to be seen from outside of the drawer.

15. The oral care products organizer according to claim 13 wherein the drawer insert is a cylindrical open-top tray for holding the dentures.

16. The oral care products organizer according to claim 15 wherein the drawer insert is non-opaque such that the dentures are adapted to be seen from outside of the drawer.

17. The oral care products organizer according to claim 15 wherein the drawer insert comprises a plurality of drainage apertures on the bottom of the drawer insert that enable moisture from the dentures to drain out of the drawer insert into the drawer.

18. The oral care products organizer according to claim 17 wherein the drawer insert comprises a tab that is adapted for a user to grasp when removing the drawer insert from the drawer or when returning the drawer insert to the drawer.

* * * * *